United States Patent [19]

Jurlaro

[11] Patent Number: 5,155,155
[45] Date of Patent: Oct. 13, 1992

[54] PHOTOACTIVATING ADDITIVE FOR POLYMER COMPOSITIONS, IN THE FORM OF A METAL SALT OF AN OXIDIZED WAX

[75] Inventor: Riccardo Jurlaro, Monza, Italy

[73] Assignee: Hoechst Italia, S.p.A., Milan, Italy

[21] Appl. No.: 749,694

[22] Filed: Aug. 26, 1991

Related U.S. Application Data

[60] Division of Ser. No. 387,942, Jul. 31, 1989, which is a continuation of Ser. No. 150,158, Jan. 29, 1988, abandoned.

[30] Foreign Application Priority Data

Feb. 2, 1987 [IT] Italy .................... 19229 A/87

[51] Int. Cl.⁵ ............................. C08L 91/06
[52] U.S. Cl. ...................... 524/275; 523/125; 523/126; 524/277; 524/278; 524/487; 524/488; 524/489
[58] Field of Search ............ 524/275, 277, 278, 487, 524/488, 489; 523/125, 126

[56] References Cited

U.S. PATENT DOCUMENTS

| | | | |
|---|---|---|---|
| 2,879,240 | 3/1959 | DeGroute et al. | 524/275 |
| 2,879,241 | 3/1959 | DeGroote et al. | 524/275 |
| 2,943,069 | 6/1960 | Rosenbaum | 524/275 |
| 3,709,819 | 1/1973 | Browning et al. | 252/8.515 |
| 3,903,064 | 9/1975 | Isigami et al. | 524/357 |
| 3,994,737 | 11/1976 | Bienvenu | 106/270 |
| 4,004,932 | 1/1977 | Bienvenu | 106/270 |
| 4,038,227 | 7/1977 | Swanholm et al. | 523/126 |
| 4,060,508 | 11/1977 | Sugahara et al. | 523/440 |
| 4,230,501 | 10/1980 | Howard et al. | 524/277 |
| 4,237,037 | 12/1980 | Takahashi | 524/277 |
| 4,501,115 | 2/1985 | Suzuki et al. | 106/36 |
| 4,609,607 | 9/1986 | Takagi et al. | 430/109 |

FOREIGN PATENT DOCUMENTS 29844 3/1977 Japan .
8467 11/1981 Japan .

*Primary Examiner*—Paul R. Michl
*Assistant Examiner*—John J. Guarriello

[57] ABSTRACT

An oxidized polyethylene wax or other wax in the form of a salt with a metal selected from groups IB, IIB, IIA, IIIA, IIIB, VIB, VIIB and VIIIB of the Periodic Table of the Elements acts as a photoactivator in a polymer composition and degrades the latter. The quantity of the additive can vary from 0.1 to 2.0% by weight, relative to the weight of the composition. The additive can be added directly or, more suitably, via a masterbatch.

9 Claims, No Drawings

PHOTOACTIVATING ADDITIVE FOR POLYMER COMPOSITIONS, IN THE FORM OF A METAL SALT OF AN OXIDIZED WAX

DESCRIPTION

This application is a division of my copending application Ser. No. 07/387,942, filed Jul. 31, 1989 now pending, which is a continuation of application Ser. No. 07/150,158 filed Jan. 29, 1988 and now abandoned.

The present invention relates to a photoactivating additive for polymer compositions, in the form of a metal salt of an oxidized polyethylene wax or other wax, to a process for the preparation thereof, to the use thereof as a photoactivator in polymer compositions and to the use of the polymer compositions thus obtained for the production of articles for use in the packaging and agricultural sectors.

The consumption of plastics in the packaging and agricultural sectors has grown increasingly over the years, creating significant disposal problems. However, whereas there was at first a trend to making these materials increasingly more stable, less prone to attack and more resistant to various mechanical stresses, to the action of heat, light and other atmospheric agents, a need began to be recognized in the 70's to render the plastic also degradable, after it has fulfilled its function, while still meeting the requirement of making the plastics stable and strong in use.

In England, Canada, Israel and other countries, the degradation of polyethylene films in the course of time was then studied. This principle is successfully exploited in agriculture for ensuring protection of crops by means of LDPE foils which must then disintegrate (a technique known as mulching).

As is known, degradation is understood as the totality of the processes which lead to a change in the physical and chemical properties, of which the molecular weight and the chemical structure of the recurring unit of the polymer are the predominant factors. A physical action due to the intervention of physical agents such as mechanical stress, light, heat and high-energy radiation or chemical agents such as water, bases, acids, oxygen, ozone and pollutant gases can lead to a progressive deterioration in the properties of the materials. In this context, the distinction reported in the literature between thermal degradation and photodegradation is only a matter of principle or expressed only if the prevalence of one of these is to be indicated.

It is also known that a chemical compound or a molecule in a polymer are photoreactive if they are capable of absorbing a light quantum. The factor responsible for the photodegradation phenomena is the ultraviolet component (short wavelength from 290 to 400 nm) in sunlight. For example, a polyethylene free of impurities has considerable resistance to UV if it is protected in an inert environment. The reason is explained by the fact that it does not have any chemical functions or groups in its molecule which are sensitive to the corrosive action of this radiation. If the polyethylene then contains, as is the case with all commercial brands, traces of metallic impurities, carbonyl groups, double bonds, traces of aromatic compounds, hydroperoxides and tertiary carbon atoms, its resistance to UV light under the same environmental conditions will be lower.

As soon as it is exposed outside to the combined action of sunlight and other atmospheric agents, amongst which oxygen predominates, its resistance will be even lower, and not only against UV.

Therefore, if the conditions in use involve exposure to sunlight and hence outside, the polyolefin plastic articles (industrial sacks, agricultural sheets, covers and the like) require additional stabilization, beyond primary stabilization, which is generally provided by the processor by means of masterbatches of additives. In the opposite case where the manufactured article should have a limited and programmed life, it will be possible to add photoactivators to the commercial polymer, that is to say active principles which are characterized, like the impurities described, by the property of absorbing radiation in the ultraviolet range and triggering the mechanisms of photooxidative degradation by accelerating the latter.

The energy absorbed by the polymeric material leads to rupture of the weak bonds of the N—N and O—O types and then attacks the stronger bonds in accordance with the energy level associated with the wavelength and promotes photochemical reactions.

The ability to absorb energy in the form of UV radiation depends also on the morphological structure of the polymer. This is the higher, the less prevalent the crystalline component as compared with the amorphous component in which the diffusion of light is more pronounced.

To explain the photodegradation caused by carbonyl groups present either as impurities in the polymer or introduced into the latter by means of ketonic photoactivators, preferably predispersed in the form of a masterbatch, mechanisms associated with the name of Norrish have been reported which cause scission of the polymer chain, elimination of CO and crosslinking.

As described above, there has of course been no lack of attempts to find additives suitable for polymer compositions, which would be able to accelerate and/or facilitate the desired process of degradation of plastics.

Thus, U.S. Pat. No. 3,903,064 describes compositions of synthetic materials, in particular polyolefins, which contain, as photoactivators, benzophenone derivatives in the form of salts with a metal selected from amongst iron, cobalt, nickel, manganese, chromium, zinc, calcium, barium, aluminum and copper.

The use of benzophenone derivatives as photoactivators for synthetic materials has also been described in numerous other publications (see for example: Benzophenone-catalyzed photodegradation of polypropylene film, Polymer Letters Edition, vol. 15, pages 435–437, 1977; The effect of various additives on the photodegradation of polyurethanes, Polymer Letters Edition, vol. 17, pages 409–413, 1979).

In U.S. Pat. No. 4,038,227, photodegradable polyolefins are described which contain, as photoactivators, an aromatic ketone, ferric stearate and a pigment.

Japanese laid open Patent Application No. 74/22,446 describes the use of polyethylene waxes as photoactivators for polyolefin compositions. This deals with compounds having "a mean molecular weight of 450 and containing 30 double bonds/1000 carbon atoms". It is stated that a 1 mm thick film becomes brittle after 100 hours exposure in an accelerated aging test apparatus with a carbon arc lamp.

After it has thus been established and proved that the presence of carbonyl, carboxyl, ester and hydroxyl groups and also organometallic compounds in polymeric materials facilitates the process of their degradation, a search was made for novel photoactivators which would improve the degradation process of synthetic substances as compared with that obtainable by known products belonging to the same group of polymers.

It has thus been found, surprisingly, that when oxidized polyethylene waxes or other waxes in the form of a salt with a suitable metal are used as photoactivators, a polymeric product is degraded much more rapidly than a similar article which contains an additive known from the literature or none at all, and in particular under the same UV exposure conditions but at a lower photoactivator concentration.

Polyethylene waxes are synthetic products obtained by polymerization. Depending on the production process, they are distinguished by a linear or partially branched structure. On oxidation, they give rise to homologous polyethylene waxes, appropriately called "oxidized", which predominantly contain carboxyl functional groups and a smaller number of carbonyl, ester and hydroxyl groups.

Schematically, oxidized polyethylene waxes can be represented by the following structures:

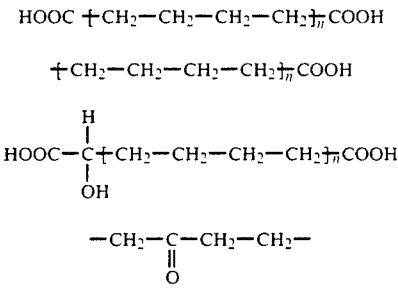

The mean molecular weight of the most widely used oxidized polyethylene waxes can vary from about 1,000 to 3,000, but higher values are possible. The minimum number of carbon atoms forming the molecular structure is about 100. The oxidized polyethylene waxes, like all waxes in general, are insoluble in water and chemically inert under normal conditions. The presence of carboxyl groups logically renders them capable of forming salts by means of salt-forming reactions which will be described in more detail below.

Moreover, these waxes do not have any toxicity towards fish and bacteria. The acute oral toxicity ($LD_{50}$) of non-oxidized and oxidized waxes, used in the present invention, in rats is, for example, >15 g/kg of body weight.

The present invention thus relates to oxidized polyethylene waxes and other waxes in the form of the salt with a metal selected from groups IB, IIB, IIA, IIIA, IIIB, VIB, VIIB and VIIIB of the Periodic Table of the Elements for use as photoactivators, directly or indirectly with a suitable vehicle, in the polymer which is to be degraded. The invention also relates to photodegradable polymer compositions comprising a thermoplastic polymer and from 0.1 to 2.0% by weight, relative to the weight of the composition, of a metal-organic compound composed of an oxidized wax in the form of a salt as described above.

Furthermore, the present invention also relates to a process for forming a salt of certain oxidized polyethylene waxes or other waxes and also to the use of the salts obtained in polymer compositions which are to be degraded, and to the use of thermoplastic polymers containing these waxes in salt form as photoactivators for the production of articles for use in the packaging sector and any technical fields concerned with agriculture, where degradation of the plastic product in a predetermined manner or in the course of time is required.

Thermoplastic polymers within the meaning of the invention are understood as LDPE, HDPE, EVA, LLDPE, PP, PS, ABS, PVC, PVAC or PMMA polymers, copolymers or physical blends thereof. The waxes successfully used as photoactivators in polymer compositions, which are to be degraded, are not exclusively restricted to the group of polyethylene waxes but also comprise other wax types. The principle of photodegradation obtained by means of forming salts of polyethylene waxes with suitable metallic derivatives can therefore also be exploited by using other types of oxidized waxes in the form of salts with the same metals of the abovementioned type. All these waxes which can be successfully used in the present invention can be subdivided into the following categories:

a) oxidized polyethylene waxes having molecular weights of 1,500 and higher and acid numbers of 10 and higher, for example Hoechst wax PED 521, Hoechst wax PED 522, Hoechst wax PED 136, etc.;

b) oxidized hydrocarbon waxes obtained by the Fischer-Tropsch process;

c) oxidized waxes derived from montan wax, for example Hoechst wax S, Hoechst wax U, Hoechst wax LP, etc.; and d) oxidized microcrystalline waxes.

The polyethylene waxes and other waxes used in the present invention differ, with respect to oxidation, from those used in the abovementioned Japanese Patent Application 74/22,446 by the presence of carboxyl and/or hydroxyl and/or ester and/or carbonyl groups and by the higher number of carbon atoms. Moreover, the waxes proposed in the Japanese patent application in question cannot at all be converted into a salt since, according to the text of the application, they have not been specifically oxidized and therefore do not contain any carboxyl groups which are the primary condition for a later formation of a salt thereof.

The metals used (in the form of organic or inorganic salts) for forming salts of the oxidized polyethylene waxes or other waxes according to the invention are those selected from groups IB, IIB, IIA, IIIA, IIIB, VIB, VIIB and VIIIB of the Periodic Table of the Elements. Amongst these, the following are to be mentioned in particular: iron, cobalt, copper, nickel, manganese, zinc, chromium, cerium, calcium, barium and aluminum.

The quantity of photoactivator (calculated as active principle) present in the polymer composition which is to be degraded can vary between 0.1 and 2.0% by weight, relative to the weight of the composition used, but preferably between 0.5 and 1.50% by weight.

To prepare the salt of the oxidized wax, a mixture composed of the wax and deionized water, generally in a ratio of 1:2.5, is charged to an autoclave. A base, preferably sodium hydroxide dissolved in a part of the deionized water, is then added and the mixture is subsequently heated at 120°-150° C., preferably at 130° C. under pressure, with stirring for about 40-60 minutes. At this time, the mixture is cooled, deionized water is added and the solution of the desired salt in a suitable solvent is then added slowly. The metal salt of the wax precipitates as an extremely fine powder which is washed with water to pH 6.5 and then dried in vacuo to a moisture content below 0.2%.

Alternatively, the wax can be first melted and the salt can then be formed by slowly adding a suitable solution of the desired metal salt. With regard to the solvent of the solution, it is appropriate to use water if the melting point of the wax is below 100° C., and a glycol ether if it is higher. After the reaction has taken place, the salt of the wax can be cooled in suitable molds and ground in a mill, and the powder obtained is washed repeatedly with deionized water to pH 6.5.

The letters used above and in the examples are defined as follows:
LDPE=low-density polyethylene
HDPE=high-density polyethylene
EVA=ethylene/vinyl acetate
LLDPE=linear low-density polyethylene
PP=polypropylene
PS=polystyrene
ABS=acrylonitrile/butadiene/styrene
PVC=polyvinyl chloride
PVAC=polyvinyl acetate
PMMA=polymethyl methacrylate The example which follows serves to illustrate the invention further, but without restricting it in any way.

EXAMPLE

Preparation of the metal salt of the oxidized polyethylene wax.

Method a)

An autoclave fitted with a mechanical stirrer was charged with a mixture composed of wax (Hoechst wax PED 522 of melting point—95° C. or Hoechst wax PED 136 of melting point—110° C.) and deionized water in the ratio of 30 parts of wax to 70 parts water. Sodium hydroxide, dissolved beforehand in a small part of the deionized water used above, was then added in a quantity sufficient for stoichiometrically neutralizing the acid number of the wax (20 and 66 respectively in the above cases). The autoclave was then heated with stirring at 130° C. for a time of about 1 hour under a pressure of 3 atmospheres. At this time, it was cooled to 40° C., deionized water at 40°-50° C. was introduced to bring the ionic emulsion which is formed to 10% solids content, and a 10% solution of $FeCl_3.6H_2O$ in water or a glycol ether was then slowly added as a fine stream, with stirring.

A double cation exchange took place, with precipitation of the ferric salt in the form of an extremely fine powder. The powder was washed with water to pH 6.5, in order to eliminate the excess ferric chloride and the traces of free chlorine, and was then dried in vacuo at a temperature below 60° C. until a moisture content of <0.2% was reached.

The solidification point was determined on a rotating thermometer (method DGF-M-III 4a63).
Wax base: 107° C.
Acid number: 65 (DGF-M-IV 2 57)
Solidification point of the salt: 135° C.

Method b)

Hoechst wax PED 136 was melted at 140° C. in a reactor having an open top and fitted with a stirrer.

After melting had taken place, a 40% solution of stoichiometric quantities of $FeCl_3.6H_2O$ or $CuCl_2$ in ethyldiglycol (diethylene glycol monoethyl ether or another glycol ether) heated beforehand to 80° C. was added slowly, first dropwise and then in a fine stream. If the formation of a double salt was desired, the solution of the iron salt was added first, followed by that of the copper salt. Any salt formation ratios of the acidic wax are possible, provided that the stoichiometric principles are observed. For example, a mixed iron/copper salt of Hoechst PED 136 wax was prepared, in which 70% (=46.2) of the acid number of 66 was assigned to the 40% $FeCl_3.6H_2O$ solution, and 30% (=19.8) was assigned to the 40% $CuCl_2$ solution, of course in the respective stoichiometric quantities.

Whenever foam formation (due to the HCl vapors evolved) was observed, the salt-forming reaction was interrupted and then resumed immediately. In the initial phase, the temperature of the molten mass rose exothermically, which is a clear sign of salt formation.

The effect is less pronounced with $CuCl_2$, in the case of the mixed iron/copper salt. During the salt formation, the temperature of the mass must not fall below 125° C. After the end of the reaction, the mass was cast in molds and cooled, and the solid mass was ground in a mill and the resulting powder was washed repeatedly with deionized water until the chlorine had disappeared and the pH was 6-6.5. Even in this case, the moisture content must not exceed 0.2%, for which purpose the product was dried in vacuo at about 60° C.

The solidification point was determined as described in method a).

Solidification point of the (70:30) Fe/Cu salt=130° C.

Other salts can be prepared in an analogous manner, also using diverse types of waxes and diverse metallic compounds as the salt-forming agents.

PHOTODEGRADABILITY TESTS

The photoactivator represents an oxidized polyethylene wax having a molecular weight of 2,000-3,000 and an acid number of 20 to 70 (method DGF-M-IV 2 57), of which a salt has been formed with iron, cobalt, copper, nickel or manganese, only with a single metal or simultaneously with several metals in diverse ratios, in accordance with stoichiometric principles.

For this particular example, the iron (III) salt of an oxidized polyethylene wax was chosen. The ferric salt obtained was then incorporated in the form of a masterbatch of 15% concentration into LDPE of melt index 190/2.16=7 g/10 minutes. Using the composition thus obtained, 50 and 100 μm thick LDPE films having a melt index of 190/2.16=2 g/10 minutes and containing 4 and 7% of the masterbatch, equal to 0.6% and 1.05% of the photoactivating additive respectively, were extruded.

The films were then subjected to UV irradiation in an accelerated aging test apparatus, Q.U.V model from the -Q-Panel Company, USA, in accordance with the following cycle:
8 hours irradiation at 60° C.;
4 hours in the dark at damp heat of 40° C., for a period of 48 hours.

The samples were evaluated by means of a) relative percentage elongation and b) the carbonyl index (ratio of the absorbancies at 1730 $cm^{-1}$ and 720 $cm^{-1}$). The results are indicated in the Table which follows.

TABLE

Exposure in the test instrument. Evaluation of the tensile and IR properties.

| FILM | IRRAD. h | THICKNESS in μm | % ADDITIVE CONC. | % ELONGATION | CO-INDEX |
|---|---|---|---|---|---|
| control | 0 | 50 | — | 220 | 0.01 |
| " | 48 | 50 | — | 175 | 0.02 |
| " | 0 | 100 | — | 500 | 0.01 |
| " | 48 | 100 | — | 420 | 0.01 |
| with additive | 48 | 50 | 0.60 | 35 | 0.16 |
| with additive | 48 | 100 | 0.60 | 40 | 0.26 |
| with additive | 48 | 50 | 1.05 | 21 | 0.26 |

The results of the instrument tests were supported and confirmed by those obtained in open outdoor exposure. The samples, taken from the same rolls as the films used for the instrument tests, were arranged on a wooden frame at 45° to the horizontal in a south-facing position.

The exposure was carried out at Lomagna (Como). After five weeks exposure the films containing the additive appeared fairly brittle. After a further twenty (20) days, the films appeared to be completely embrittled, whereas the control samples were still intact.

Similar results were obtained when using oxidized waxes of diverse structures, in the form of salts with metals other than iron.

I claim:

1. A photodegradable polymer composition, which comprises a thermoplastic polymer and from 0.1 to 2.0% by weight, relative to the weight of the composition, of a metal salt in which said metal salt comprises (a) an oxidized polyethylene wax of one of the following structure:

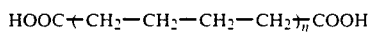
HOOC+CH₂—CH₂—CH₂—CH₂₎ₙCOOH

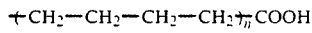
+CH₂—CH₂—CH₂—CH₂₎ₙCOOH

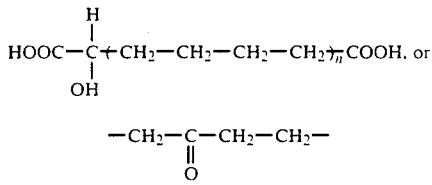
$$HOOC-\underset{\underset{OH}{|}}{\overset{\overset{H}{|}}{C}}+CH_2-CH_2-CH_2-CH_2\rightarrow_n COOH, \text{ or}$$

—CH₂—C—CH₂—CH₂—
     ‖
     O wherein n is selected to provide a mean molecular weight of at least about 1000, wherein the metal used for forming the salt of the wax is an iron or a mixed iron/copper or (b) an oxidized wax belonging to one of the following classes:
  a) hydrocarbon waxes obtained by the Tropsch process,
  b) montan wax or
  c) microcrystalline waxes,
wherein the metal in the salt used for forming the salt of the wax is a metal of group IB, IIB, IIA, IIIB, VIB, VIIB or VIIIB of the Periodic Table of the Elements or a combination of these metals.

2. A polymer composition as claimed in claim 1, wherein the metal in the salt used for forming the salt of the wax (b) is cerium or a metal of Group IB, VIB, VIIB or VIIIB of the Periodic Table of the Elements or a combination of these metals.

3. A polymer composition as claimed in claim 2, wherein said metal is iron, cobalt, copper, nickel, manganese, chromium, cerium, or a combination of these metals.

4. A polymer composition as claimed in claim 1, wherein the metal salt is a salt of a said oxidized polyethylene wax.

5. A polymer composition as claimed in claim 1 which is photoreactive when exposed to light having a wavelength in the range of 290 to 400 nm, comprising a metal salt of an oxidized polyethylene wax of one of the following structures:

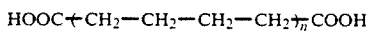
HOOC+CH₂—CH₂—CH₂—CH₂₎ₙCOOH

A+CH₂—CH₂—CH₂—CH₂₎ₙCOOH

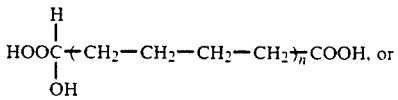
$$HOOC-\underset{\underset{OH}{|}}{\overset{\overset{H}{|}}{C}}+CH_2-CH_2-CH_2-CH_2\rightarrow_n COOH, \text{ or}$$

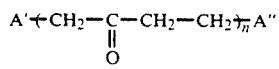
A'+CH₂—C—CH₂—CH₂₎ₙA"
        ‖
        O wherein n in each case is selected to provide a mean molecular weight of at least about 1000, and A, A', and A" are all terminal groups, which can be the same or different.

6. A photodegradable polymer composition as claimed in claim 1, wherein the quantity of said metal salt is between 0.5 and 1.50% by weight.

7. A photodegradable polymer composition as claimed in claim 1, wherein the thermoplastic polymer is an LDPE, HDPE, EVA, LLDPE, PP, PS, ABS, PVC, PVAC or PMMA polymer, copolymer or physical blend thereof.

8. A method for photoactivating and hence enhancing the photodegradability of a polymer, comprising the step of adding to the polymer a metal salt of (A) an oxidized polyethylene wax of one of the following structures:

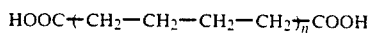
HOOC+CH₂—CH₂—CH₂—CH₂₎ₙCOOH

+CH₂—CH₂—CH₂—CH₂₎ₙCOOH

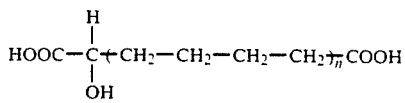
$$HOOC-\underset{\underset{OH}{|}}{\overset{\overset{H}{|}}{C}}+CH_2-CH_2-CH_2-CH_2\rightarrow_n COOH$$

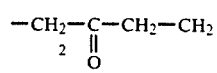
—CH₂—C—CH₂—CH₂
  2   ‖
      O wherein the metal used for forming the salt of the wax is an iron or a mixed iron/copper or (B) an oxidized wax belonging to one of the following classes
  a) hydrocarbon waxes obtained by the Tropsch process,
  b) montan wax or
  c) microcrystalline waxes,
wherein a metal in the salt used for forming the salt of the wax is selected form groups IB, IIIA, IIIB, VIB, VIIB and VIIIB of the periodic Table of Elements.

9. A method as claimed in claim 8, wherein the metal used for forming the salt of the wax (B) is cerium or a metal of Group IB, VIB, VIIB or VIIB of the Periodic Table of the Elements or a combination of these metals.

* * * * *